US007586270B2

(12) United States Patent
Niggemeyer et al.

(10) Patent No.: US 7,586,270 B2
(45) Date of Patent: Sep. 8, 2009

(54) CIRCUIT AND METHOD FOR THE OPERATION OF MINIATURE HIGH PRESSURE SHORT-ARC LAMPS USING ALTERNATING CURRENT

(75) Inventors: Gert G. Niggemeyer, Buchholz i.d.N. (DE); Jorg Niggemeyer, Buchholz i.d.N. (DE)

(73) Assignee: Nucon GBR, Buchholz (DE)

( * ) Notice: Subject to any disclaimer, the term of this patent is extended or adjusted under 35 U.S.C. 154(b) by 117 days.

(21) Appl. No.: 11/401,117

(22) Filed: Apr. 10, 2006

(65) Prior Publication Data
US 2006/0261755 A1 Nov. 23, 2006

(30) Foreign Application Priority Data
Apr. 11, 2005 (DE) .................. 20 2005 005 791 U

(51) Int. Cl.
*H05B 37/02* (2006.01)
(52) U.S. Cl. .................. 315/291; 315/227 R; 315/224; 315/209 R; 315/DIG. 7
(58) Field of Classification Search .................. 315/291, 315/307, 308, 289, 227 R, 224, 209 R, DIG. 7
See application file for complete search history.

(56) References Cited
U.S. PATENT DOCUMENTS
4,922,396 A  5/1990  Niggemeyer .................. 363/21

| 5,003,231 | A | 3/1991 | Perper | 315/291 |
| 5,565,743 | A | 10/1996 | Yamashita et al. | 315/310 |
| 5,932,976 | A | 8/1999 | Maheshwari et al. | 315/291 |
| 6,380,694 | B1 | 4/2002 | Uchihashi et al. | 315/244 |
| 6,437,515 | B1 * | 8/2002 | Kamoi et al. | 315/209 R |
| 6,486,615 | B2 * | 11/2002 | Hui et al. | 315/291 |
| 7,129,650 | B2 * | 10/2006 | Komatsu et al. | 315/291 |
| 7,154,228 | B2 * | 12/2006 | Van Casteren et al. | 315/209 R |

FOREIGN PATENT DOCUMENTS

| DE | 196 27 989 A1 | 1/1997 |
| EP | 0 301 436 B1 | 2/1989 |
| EP | 0 596 741 A2 | 11/1994 |
| EP | 0 984 670 A2 | 8/2000 |

OTHER PUBLICATIONS

Unitrode Integrated Circuits HID Lamp Controller UCC2305, UCC3305, 8 pages, Sep. 1995.

* cited by examiner

*Primary Examiner*—Douglas W Owens
*Assistant Examiner*—Ephrem Alemu
(74) *Attorney, Agent, or Firm*—Seed IP Law Group PLLC

(57) ABSTRACT

An embodiment of the invention is concerned with a circuit and a method for the generation and operation of the plasmas in High Pressure Short Arc Lamps having miniature dimensions using alternating current. In the method, by means of the selection values of particular operating parameters of a half-bridge amplifying circuit and by means of additionally few circuit components, a lamp voltage characteristic is achieved that prevents the extinguishing of the arc under typical operating conditions.

3 Claims, 3 Drawing Sheets

CIRCUIT AND METHOD FOR THE OPERATION OF MINIATURE HIGH PRESSURE SHORT-ARC LAMPS USING ALTERNATING CURRENT

BACKGROUND OF THE INVENTION

1. Field of the Invention

The invention relates to a circuit and a method for the creation and the operation of the plasmas of high pressure short-arc lamps having small dimensions.

2. Description of the Related Art

High pressure cold cathode gas discharge lamps, as, for example, are used in vehicle headlights, require special circuits for controlling the ignition and the resulting stable operation of the arc. The operation using alternating current causes the arc to radiate a white light that is uniformly distributed. In addition, the operation of gas discharge lamps using alternating current is desirable in order to achieve a high durability.

When operating using alternating current a critical phase of the operation is reached at the change in polarity, the so called "zero crossing point", in which the lamp can extinguish itself when the sum, made up of the voltage drop across the arc length and across both electrode plasma transition zones, is greater than the external lamp operating voltage of the pre-switching device.

BRIEF SUMMARY OF THE INVENTION

The task of an embodiment of the invention is to create a plasma in an arc lamp of small dimensions that during the operation with alternating current, prevents the lamp's current from breaking the arc after such a change in polarity, leading to the lamp extinguishing itself.

Using the circuit and method of the kind described, this task is accomplished by the given characteristics of the patent claims.

The circuit according to an embodiment of the invention, is characterized by the fact that the effective value of the direct current, that feeds the plasma alternating current, is kept constant when averaged over time.

The circuit according to an embodiment of the invention and the corresponding method differentiate themselves from conventional systems in that the voltage, applied across the arc, exhibits a steep increase in its rise during each half cycle that can also increase exponentially in the case where the current flow through the lamp is broken after passage through this "zero crossing point", whereby the loading due to the arc collapses in turn, but owing to this extremely quick rising exponential increase of the voltage that occurs when the arc is re-ignited, the current flow through the lamp is sustained in spite of the fact that, during this phase, the controlled source of the direct current is unable to react because of its inherent inertia.

In one embodiment, the fundamental principles of an electronic power supply device are further used as follows:

the voltage delivered by the inverter mirrors the power drawn from the controlled direct current of the DC-DC converter.

In one embodiment, in order to ignite the plasma, an additional ignition circuit adds high voltage impulses, that enable the maintenance of the arc by means of the alternating current provided by the inverter and which are only generated when the direct current, provided by the direct current source, exceeds a particular minimum value, which is limited in its duration by a safety circuit.

According to this means, a simple circuit with high efficiency is provided for both the ignition and the operation of the gas discharge lamp that especially, by means of the control of the direct current source according to requirements, results from the power supplied to the plasma.

This fundamental circuit principle is already used successfully in different designs that thereby are characterized in that the initial sine like voltage gradient approximates a trapezium like curve form as it approaches the end of a half wave cycle.

Xenon lamps used in vehicles are predominately driven with square wave like alternating current. Using this principle, the extinguishing of the arc is avoided in that during the passage through the "zero crossing point", a particularly steeply graded rising flank of the next square wave like impulse minimizes the period of weak current flow. In particular therefore, the inductance of the ignition coil, which is in series with the lamp, may not assume too large a value because through this, the gradient of the rising flank of every square wave like impulse will be diminished.

No particular problems occur using conventional principles in combination with vehicle arc lamps of the type D2S because the voltage required to keep the lamp burning corresponds substantially to the voltage drop across the electrodes.

During a rapid change of the "zero crossing point", as happens for example with square wave like currents, the instantaneous available voltage for lamp illumination is fed to the lamp in periodic reversals of polarity. After the drain of the voltage drop across both electrodes, a sufficiently large potential difference remains to guarantee immediately a renewed current flow in the opposite direction and without any time delay.

Furthermore, the electrodes in the combustion chamber of the lamp are maintained at a sufficiently high operating temperature by their spatial disposition such that a voltage drop across the electrodes during this short time period of the polarity reversal cannot attain a high enough value. A high operating temperature of the electrodes reduces the energy required by the electrons to migrate out of the metal and reduces the voltage drop across the electrodes.

In contrast, the relationship of the voltage drop across both electrodes to the voltage required to keep the light burning in Xenon lamps with extremely small spatial dimensions, and additionally linked with low power consumption such as, for example, 21 W, as well as a concurrent reduction in the electrode gap and furthermore through their thermally unfavorable spatial configuration, makes a sufficiently high operating temperature for operation with alternating current ever more unfavorable. This makes their operation with square wave form alternating current practically impossible.

The temperature of the electrodes can sink unpredictably depending on the position or movement of the lamp in the case where the electrodes, for constructional reasons, protrude only slightly into the combustion chamber of the lamp and moreover lie very close to the neighboring quartz glass of the combustion chamber of the lamp.

In such Xenon lamps of small dimensions, thereby even with direct current operation, a sudden rise in the lamp operating voltage can come about, which cannot always be compensated by the self induced voltage during current breakage by the serial inductance of the coil that is always present and which then leads to the extinguishing of the lamp.

Operation with a sine like voltage characteristic is likewise not possible because the time until the peak voltage value is reached is too long because it is a factor of √2 higher than a corresponding square wave like voltage and because the inductance of the coil, that is generally in series with the lamp, delays the voltage rise.

The task of an embodiment of the invention is to attain a voltage characteristic across the lamp using few components together with the utilization of suitable operating parameters that allows the operation of a critical short arc lamp using alternating current that exhibits a steeply graded rising flank and pronounced instantaneous excess voltage peaks.

This task is solved according to an embodiment of the invention in that out of a characteristic sine like voltage waveform of a conventional oscillation circuit, a pulsating saw tooth like characteristic is derived with the help of an additional secondary oscillation circuit, the latter beginning with almost a double initial amplitude which then drops down as the end of the half cycle approaches.

The voltage of the additional oscillation circuit is superimposed on the fundamental waveform of the first oscillation circuit, which can also overcome the high resistance during changes of polarity, in that the stored energy in the choke of this additional oscillation circuit leads to an extremely rapid and high voltage rise at the lamp, in the case that the lamp should exhibit a high resistance after the polarity change. The current flow through the lamp can quickly be re-established instantaneously after every change of polarity and the arc is maintained.

In one embodiment, a circuit for the ignition and operation of a plasma in an arc lamp, in particular a miniature high pressure short arc gas discharge lamp, consists of a regulated DC-DC-converter, a circuit for regulating the power of the lamp, a half-bridge inverter and an Ignition circuit, characterized in that the DC-DC-converter controls the plasma according to the power drawn and the regulated direct current is converted into alternating current by the adjoining half-bridge inverter, the circuit featuring additional circuit components of an oscillation circuit and an ignition coil in series with the lamp. In one embodiment, two inductances, connected in series with a gas discharge lamp, serve as a store and a second oscillation circuit is established at their connection point consisting of a condenser and resistance, whereby the condenser and the resistance are connected in series with one another, both being connected in parallel at the connection point with the gas discharge lamp and its series connected ignition coil. In one embodiment, the series oscillation circuit, consisting of both inductances of the ignition coil in series with the storage throttle/choke as well as alternately with the condensers, and the half-bridge circuit of the inverter, are driven by such a high frequency of the inverter so that the output voltage of the half-bridge inverter features a saw-tooth like half cycle having a falling amplitude at its end. In one embodiment, the Ignition by means of the ignition transformer consists of ignition impulses that are only used to start the lamp and are not used for the normal operation of the lamp, and exclusively voltage impulses are generated by the secondary windings of the ignition coil either by means of the stored energy in the choke or by the stored energy in the ignition coil because of the interruption of the current flowing through the lamp. In one embodiment, the DC-DC-converter is only controlled according to the power taken up by the lamp and the voltage peaks at the alternation of every half cycle are solely dependent on the parameters of two oscillation circuits and the operating frequency of the lamp.

In one embodiment, a method for the ignition and operation of a plasma in an arc lamp, in particular a miniature high pressure short arc gas discharge lamp, consisting of a regulated DC-DC-Converter, a circuit for regulating the power of the lamp, a half-bridge inverter and an Ignition circuit, wherein the DC-DC-Converter controls the plasma according to the power drawn and the regulated direct current is converted into alternating current by the adjoining half-bridge Inverter, the circuit featuring additional circuit components of an oscillation circuit and an ignition coil in series with the lamp, in order to shorten the voltage rise of each half cycle when the storage throttle/choke is discharged. In one embodiment, two inductances connected in series with a gas discharge lamp serve as a store and a second oscillation circuit is established at their connection point consisting of a condenser and resistance, whereby the condenser and the resistance are connected in series with one another, both being connected in parallel at the connection point with the gas discharge lamp and its series connected ignition coil. In one embodiment, the series oscillation circuit, consisting of both inductances of the ignition coil in series with the storage throttle/choke as well as alternately with the condensers, and the half-bridge circuit of the inverter, are driven by such a high frequency of the inverter so that the output voltage of the half-bridge inverter features a saw-tooth like half cycle having a falling amplitude at its end. In one embodiment, the ignition by means of the ignition transformer consists of ignition impulses that are only used to start the lamp and are not used for the normal operation of the lamp, and exclusively voltage impulses are generated by the secondary windings of the ignition coil either by means of the stored energy in the choke or by the stored energy in the ignition coil because of the interruption of the current flowing through the lamp. In one embodiment, the DC-DC-converter is only controlled according to the power taken up by the lamp and the voltage peaks at the alternation of every half cycle are solely dependent on the parameters of two oscillation circuits and the operating frequency of the lamp.

In one embodiment, a circuit for controlling an arc lamp comprises a regulated DC-DC-Converter, a circuit for regulating a power of the lamp, a half-bridge inverter configured to convert direct current supplied by the DC-DC converter to an alternating current, an ignition circuit configured to couple at a first end with a first end of the lamp, and an oscillation circuit coupled to the ignition circuit and configured to supply a peak voltage at an alternation of a half-cycle. In one embodiment, the oscillation circuit comprises an inductor coupled between a second end of the ignition circuit and the half-bridge inverter, and a branch having a capacitor coupled in series with a resistor, wherein a first end of the branch is coupled to the second end of the ignition circuit and a second end of the branch is configured to couple to a second end of the lamp. In one embodiment, an output voltage of the half-bridge inverter has a saw-tooth half cycle with a falling amplitude. In one embodiment, the ignition circuit comprises a transformer having secondary windings configured to generate ignition pulses. In one embodiment, the ignition circuit is configured to generate the ignition pulses using energy stored in the inductor. In one embodiment, the ignition circuit is configured to generate the ignition pulses using energy stored in the ignition circuit. In one embodiment, the DC-DC converter is controlled according to a power drawn by the lamp and a voltage peak at an alternation of a half-cycle is a function of parameters of the oscillation circuit.

In one embodiment, a method of controlling an arc lamp comprises regulating a DC-DC converter; regulating power supplied to the lamp; converting a DC current supplied by the DC-DC converter to an alternating current using a half-bridge inverter; storing, during a first half-cycle, energy in a choke coupled to an ignition coil; and providing a voltage peak by discharging energy from the choke during a second half-cycle. In one embodiment, the choke is part of an oscillation circuit having a branch with a capacitor coupled in series with a resistor, the branch being coupled in parallel across the ignition coil and the lamp. In one embodiment, the voltage peak is a function of parameters of the oscillation circuit. In one embodiment, a voltage output of the inverter has a sawtooth configuration with a falling amplitude at an end. In one embodiment, the method further comprises igniting the lamp by generating an ignition pulse in a secondary winding of the ignition coil. In one embodiment, the method further comprises using energy stored in the choke to generate the ignition pulse. In one embodiment, the method further comprises using energy stored in the ignition coil to generate the ignition pulse.

An embodiment of the invention will be explained by making use of the schematic drawings and the voltage characteristics within the circuit.

BRIEF DESCRIPTION OF THE SEVERAL VIEWS OF THE DRAWING(S)

FIG. 1 shows a conventional circuit layout made up of a half-bridge layout consisting of two transistors 4 and 5 with the coil 3 whose inductance produces a series-oscillation-circuit in conjunction with condensers 1 and 2.

FIG. 2 shows of the circuit layout of FIG. 1 but extended by a second series oscillation circuit according to an embodiment of the invention, comprising an inductance 6 which is additionally in series with the coil 3 and the half bridge amplifier, and a condenser 7 in series with the resistor 8, both of which are mounted in parallel across the lamp 9 and the coil 3 the latter two being in series with each other.

DETAILED DESCRIPTION OF THE INVENTION

Figure 1:
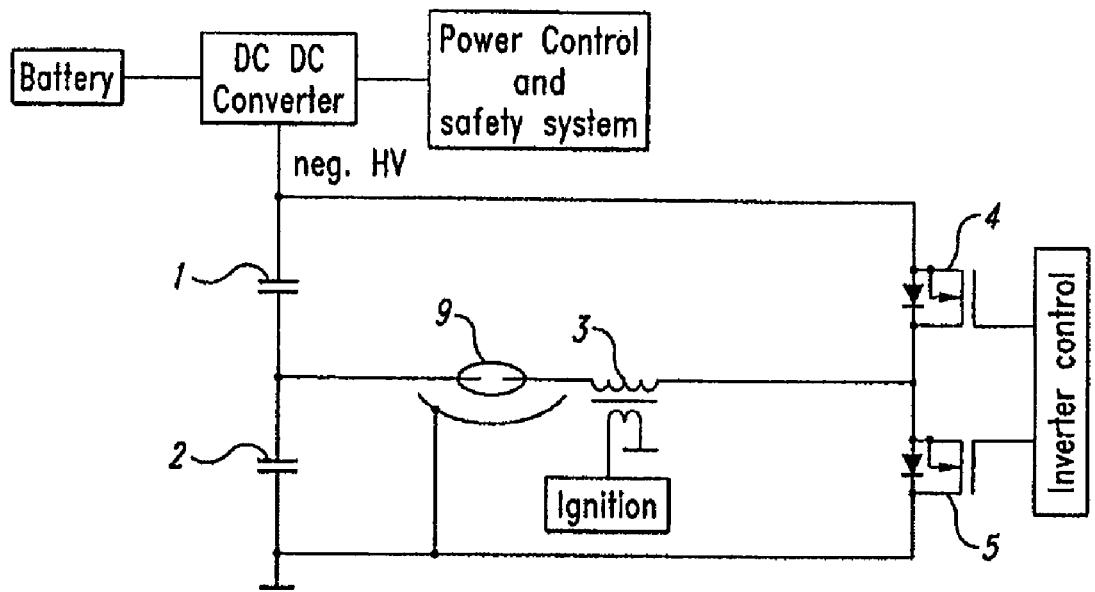

The circuit and the method according to an embodiment of the invention function in detail as follows:

An inverter, that is only shown here schematically, controls two MOSFETS 4 and 5 within a half-bridge amplifier in such a manner that only one of the transistors can be conductive when the transistor that was previously conductive is completely locked. Thereby a separate voltage control of the MOSFETS is preferably used.

A regulated DC-DC-Converter described in the documents EP-B-0 301 436 and in U.S. Pat. No. 4,922,396, supply the half-bridge amplifier with power dependent direct current. This direct current is connected to capacity voltage divider, which is only shown here schematically, and with the condensers 1 and 2, each with half negative rectified direct current neg. HV.

The DC-DC-Converter is controlled by a schematically displayed power control circuit, as described in the patent application DE 196.27989 A1. The DC-DC-Converter delivers its controlled half negative rectified negative output voltage neg. HV to the MOSFETS 1 and 2 of the half-bridge amplifier.

The DC-DC-Converter itself is connected to a source voltage supply battery that, for its part, supplies the voltage to the other control elements that are shown.

Connection points 10 and 13 of the half-bridge amplifier are connected to the gas discharge lamp 9 in which the plasma is first ignited and then operated by means of a storage throttle/choke 6 and the secondary winding of the ignition transformer 3.

The electrical power consumed by the lamp is constantly regulated.

The primary winding of the ignition transformer 3 is supplied with high voltage impulses from an ignition circuit Ignition when the DC-DC-Converter first generates its time limited maximum voltage to start the lamp.

The characteristic curve of the alternating current at the connection points 10 and 13 of the half-bridge amplifier is determined by the dimensions of the condensers 1 and 2, the inductance of the ignition coil 3, the inductance of the storage throttle/choke 6 as well as the frequency of the Inverter.

Figure 5:
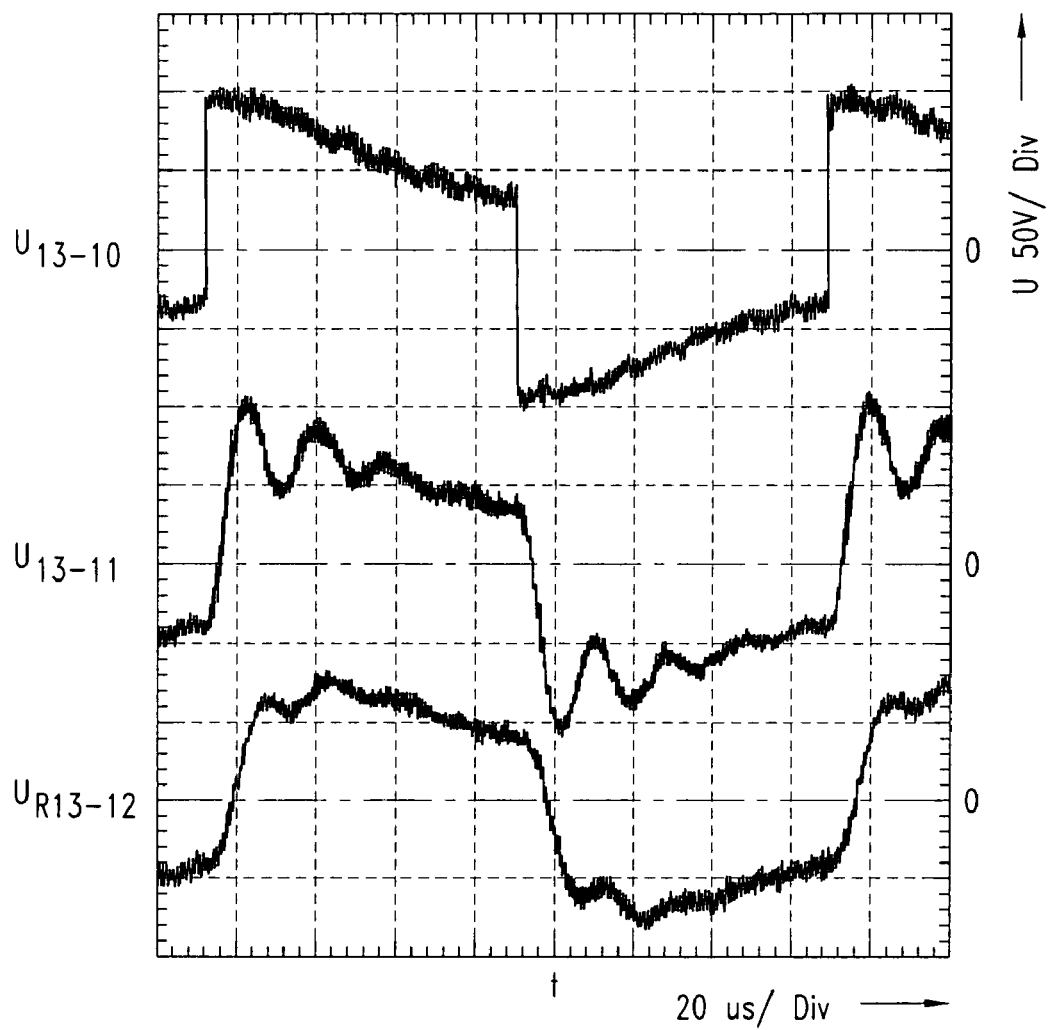
FIG. 5 shows the voltage characteristics within the circuit diagram of FIG. 4 which results from the resistive load of 147 Ohms.
Figure 6:
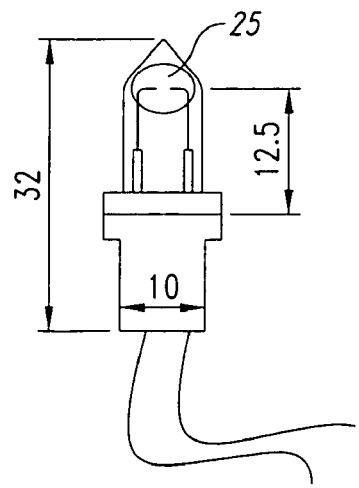
FIG. 6 shows a miniature short arc lamp of the type 21 W H3, whose combustion chamber exhibits such small dimensions, such that the electrodes are placed extremely near to the quartz glass envelope and which can easily experience a drop in temperature.

In FIG. 5, measurement curves of the voltage characteristics are shown whereby a resistance with a value equivalent to that of the lamp has been substituted. The resistance was chosen in order to provide the circuit with constant load.

In the curve as shown, a resistance of 147 Ohms was selected, which was constantly loaded with a power of 21 W.

Curve $U_{13\text{-}10}$ shows the differential voltage characteristics across the connection points 10 and 13: at a frequency of about 6 kHz there is a characteristic saw tooth like alternating current characteristic: at the start of every positive or negative half cycle the amplitude has a value of about 100V and then falls to a value approximately below 50V. The polarity is reversed to facilitate the operation of the lamp.

Curve $U_{13\text{-}11}$ shows the differential voltage characteristics across the connection points 11 and 13: it superimposes an oscillation with a shorter periodicity on the saw tooth like curve $U_{13\text{-}10}$. The superimposed oscillation is generated by a second additional series oscillation circuit, which is formed by the storage throttle/choke and the condenser. An additional series resistance attenuates this circuit. In contrast to curve $U_{13\text{-}10}$, curve $U_{13\text{-}11}$ displays a slightly delayed rising flank.

Curve $U_{R13\text{-}12}$ shows the differential voltage characteristics across the connection points 12 and 13 with a load resistance of 147 Ohms. Here the characteristic voltage is further smoothed to that shown in curve $U_{13\text{-}11}$ by the secondary inductance of the ignition coil 3. Also the maximum amplitude is reached at a later point and thus has the appearance that the previously attained steeply rising flank of curve $U_{13\text{-}10}$ is further reduced by this additional circuit configuration.

In contrast to a purely resistive load, the resistance of an arc lamp over a half cycle is highly variable and depends also momentarily very strongly on the chosen amplitude characteristics.

Figure 3:
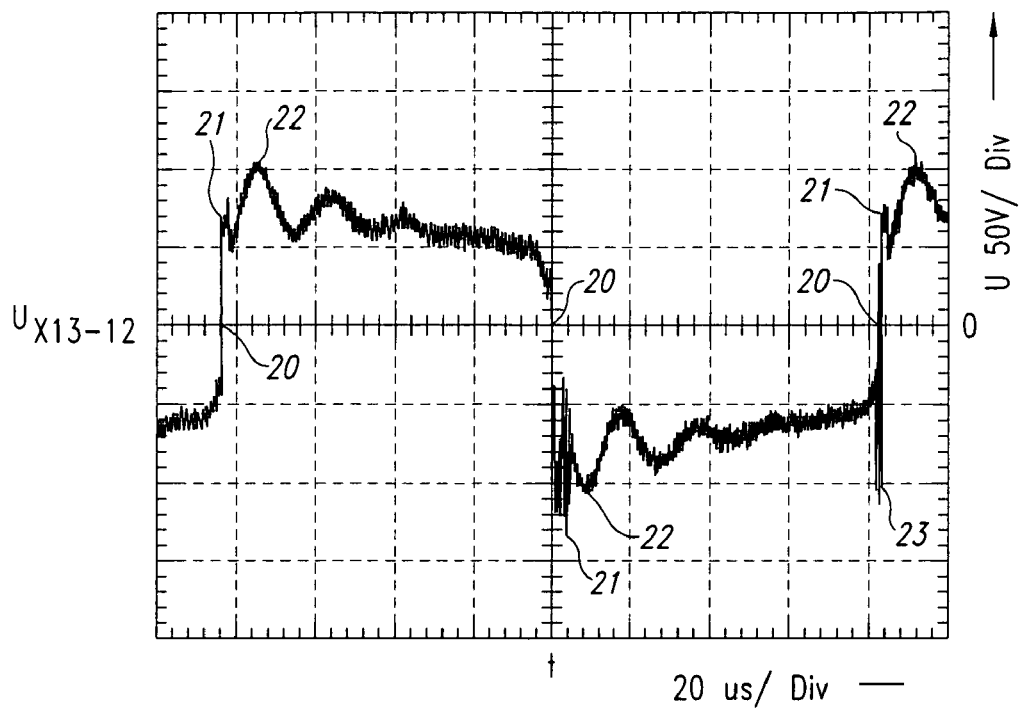
FIG. 3 shows the operating voltage characteristics of the lamp according to the circuit diagram of FIG. 2.
Figure 4:
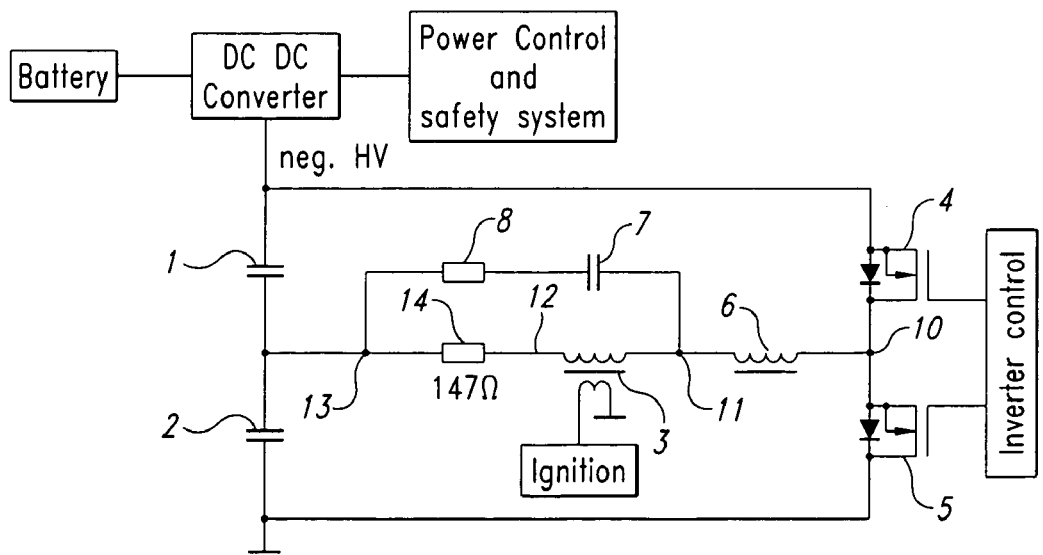
FIG. 4 shows the circuit diagram of FIG. 2 which has been modified by substituting an electrical resistance 14 whose value is 147 Ohm in place of the lamp 9.

FIG. 3 shows the differential voltage characteristics $U_{X13\text{-}12}$ across the connection points 12 and 13 specifically of the non linear resistance of the Xenon lamp 9, which is shown in a critical state of being near to extinguishing itself, but which can be actually prevented by the circuit according to the invention: After passage across a "zero crossing point" 20, the voltage across the lamp, that is required to keep the lamp burning in the case of non interrupted current flow, rises slowly and tapers off at the maximum 22. The lamp however displays a high resistance so that the voltage delivered by the pre-switching device can reach a value of up to 120V and is allowed to rise with extremely steep rising flanks 21 and so causes a renewed instantaneous regeneration of the arc. The average lamp operating voltage of the measured lamp however corresponds to approximately only 65V. The part of the curve 22 directly following this peak then appears similar to the curve $U_{13-11}$ and surprisingly has little similarity with, or any correlation to, the curve $U_{R13-12}$.

The reason for this is that the resistance of a Xenon lamp changes after the instantaneous current flow of a half cycle. As a result, the resistance of a Xenon lamp is higher when the current flow is low than in the case of a nominal current flow. In the case of high current flow in contrast, the resistance decreases. The average resistance of the lamp rises with increasing temperature because the internal gas pressure rises.

This has, for example, the consequence that the resistance of the lamp is greater with diminishing power so that the operating voltage of the lamp rises although one reduces the power. A well-developed and refined control circuit is able to maintain the power and stability of the lamp constant under such unusual conditions.

If the amplitude characteristics of such a miniature Xenon lamp are chosen which are not constant with regard to time as, for example, a sine voltage is, then this leads to the consequence that during the phase that the amplitude of voltage and current drops and from a minimum amplitude point of the voltage, the lamp can already can extinguish itself, that is, current no longer flows and only after the reversal of the polarity is the lamp re-ignited, see also FIGS. 3-23.

In the case of sine like or too slowly rising voltage characteristic curves which result from circuits such as that that is displayed in FIG. 1, the rising voltage characteristics are more or less uninfluenced by the instantaneous current consumption. The lamp can freely extinguish itself, because the temporary stored energy is not present to generate a voltage peak 21 just before the peak value 22.

In the case where the arc should extinguish itself just directly after passage through the "zero crossing point", the circuit according to an embodiment of the invention is so designed such that a voltage peak 21 with an extremely steep rising flank is generated, because, owing to the presence of additional circuit components, a second inductive storage 6 is charged with energy after every polarity change, and whose energy, when necessary, immediately provides for a voltage peak.

Figure 2:
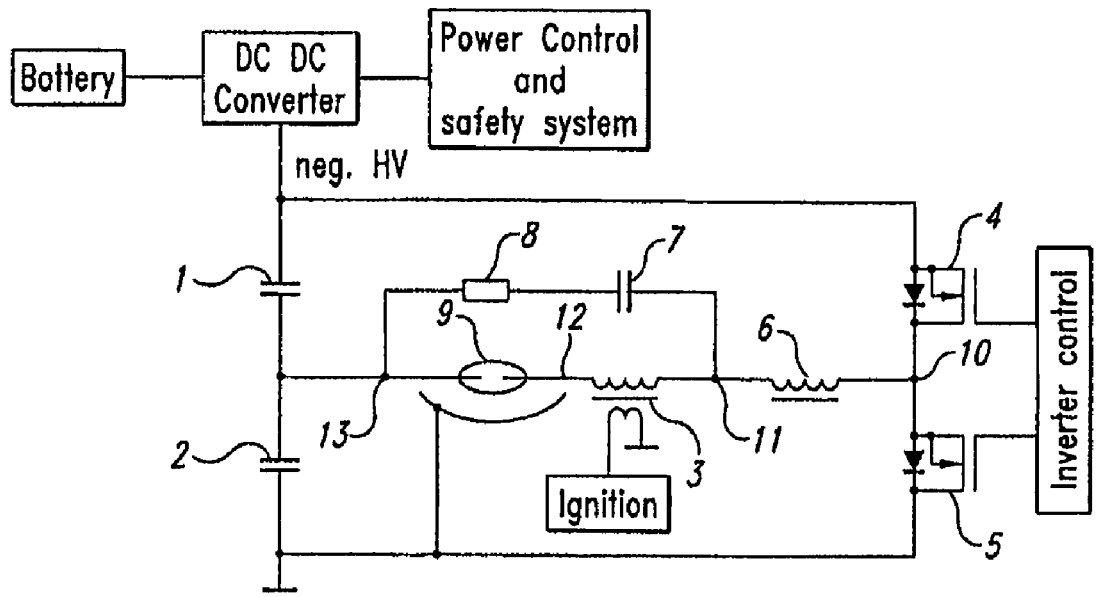

In the case of the circuit according to the embodiment of FIG. 2, it is possible to see, by utilizing the curves from FIG. 3 that the inverter providing the primary voltage source, made up of transistors 4 and 5, generates a definite voltage peak with corresponding steeply graded flanks, as measured at its output across the lamp between the points 13 and 10.

However, such a voltage characteristic cannot be directly achieved across such a discharge path. The presence of the additional inductance of the ignition coil 3 and the choke 6 enables such a characteristic to be achieved.

On the one hand the inductance of the ignition coil 3 is necessary because it acts as a choke to prevent a completely unregulated discharge current across the lamp; on the other hand the inductance of the ignition coil is unfavorable because it opposes a rapid voltage increase across the lamp at the "zero crossing point".

According to an embodiment of the invention a second oscillation circuit in parallel to the lamp helps as a workaround out of this contradiction, and consists of storage throttle/choke 6, a condenser 7 and an attenuating resistance 8.

When the inverter switches over, the choke 6 is first charged in which a reloading current begins to flow through the condenser 7 and the resistance 8. If one examines precisely the three superimposed curves of FIG. 3, one is able to ascertain that the "zero crossing point" i.e., the current-less state of the ignition coil choke 3 is delayed with respect to the curves $U_{13-10}$ and $U_{13-11}$. Choke 6 is already charged as a store through current flow, and can try, in the case of an absence of current flow across the lamp 9 and the ignition coil choke 3, to deliver its stored energy with a voltage peak that is superimposed on the saw-tooth like voltage of curve $U_{13-10}$.

The resistance 8 serves to limit the maximum peak current through the choke 6 and delays and disperses the possible voltage peak that one can obtain across the lamp during this phase. The condenser 7 possesses a pretty large capacity which, on the other hand, leads to losses during the discharging of the condenser 7 into the choke 6 at high frequencies. The capacity is in the case of the embodiment of the present circuit set at 15 nF. The inductance of the additional choke 6 corresponds approximately to that of the ignition coil 3 (in an example concrete practical case: 1 mH).

The series oscillation circuit delivers the required voltage peaks at the chosen alternating current frequency with the chosen parameters.

A super oscillating waveform, as occasionally and undesirably emerges from function generators, would be so strongly amplified according to an embodiment of the invention that, in the case of high resistance lamps, a high voltage peak would be superimposed on the saw-toot like voltage waveform. The losses in the choke 6 can be limited by choosing the value of the condenser 7 that is not too large.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system, comprising:
   a first node configured to couple to a first potential;
   a second node configured to couple to a second potential;
   a first capacitor coupled between the first node and a third node, wherein the third node is configured to couple to a miniature high pressure short arc gas discharge lamp;
   a second capacitor coupled between the third node and the second node;
   a first switch coupled between the first node and a fourth node;
   a second switch coupled between the fourth node and the second node;
   a resonance circuit coupled between the fourth node and the third node and configured to resonant at a resonance frequency, the resonance circuit comprising:
      an inductor coupled between the fourth node and a fifth node configured to couple to a secondary winding of an ignition transformer;
      a sixth node configured to couple to the secondary winding of the ignition transformer and to the miniature high pressure short arc gas discharge lamp; and
      a third capacitor coupled between the third node and the fifth node; a resistor coupled between the third capacitor and the third node; and
   a controller configured to control the first and second switches in an ignited steady state with a toggling period having a frequency lower than the resonance frequency, such that the first switch is closed when the second switch is opened, the second switch is closed when the first switch is opened, and an output between the sixth and third nodes has a saw-tooth wave form with a falling amplitude in a half-cycle of the toggling period and a peak resonance component immediately after toggling, wherein a voltage at the lamp has a resonant oscillation with the resonance frequency superimposed on a basic voltage supplied by the first and second capacitors, and respective capacitance values of the first and second capacitors and the controller of the toggling period are configured to provide a saw-tooth declination of the basic voltage with a decline in amplitude within the half cycle of the toggling period from an initial basic voltage to approximately half the initial basic voltage.

2. An electrical circuit to control an ignited steady state of a miniature high pressure short arc gas discharge lamp, the circuit comprising:

a series circuit of two power supply capacitors and a series circuit of two switches, these two series circuits being connected in parallel and configured to couple to a DC power source;

a bridge coupled between a common connection of the capacitors and a common connection of the switches, the bridge including:

a lamp, a secondary winding of an ignition transformer and a load impedance coupled together in series; and a bridge capacitor in series with a resistor are coupled in parallel across the series connection of the lamp and the secondary winding of the transformer; wherein the bridge capacitor coupled to the lamp through the resistor configured to provide a damping factor to limit the value of the resonant voltage; and an inverter control circuit configured to toggle the switches with a toggling frequency such that either the first switch is continuously conducting and the second switch is non-conducting, or vice-versa, wherein the bridge capacitor in series with the load impedance is configured to resonate with a resonance frequency substantially higher than the toggling frequency, such that a peak resonant voltage is provided to the lamp immediately after toggling and then the voltage at the lamp follows a resonant oscillation with the resonant frequency superimposed on a basic voltage supplied by the respective power supply capacitor, and the toggling frequency and the values of the power supply capacitors are configured to provide a saw-tooth declination of the basic voltage with a decline in amplitude within a half cycle of the toggling period, falling down from an initial basic voltage to about half of the initial basic voltage.

3. An electrical circuit to control an ignited steady state of a miniature high pressure short arc gas discharge lamp, the circuit comprising:

two power supply capacitors coupled together in series and configured to couple to a DC power source;

first and second switches coupled together in series and configured to couple to the DC power source in parallel with the two power supply capacitors;

a bridge coupled between a common connection of the two power supply capacitors and a common connection of the first and second switches, the bridge including:

a lamp, a secondary winding of an ignition transformer and a load impedance coupled together in series; and a capacitance branch coupled in parallel across the lamp and the secondary winding of the ignition transformer; wherein the capacitance branch comprises a resistor coupled in series with a bridge capacitor; and a controller configured in an ignited steady state to toggle the switches with a toggling frequency with the first switch always conducting during a first half-cycle of a toggling period and the second switch always conducting during a second half-cycle of the toggling period, wherein the capacitance branch and the load impedance are configured to resonate with a resonance frequency substantially higher than the toggling frequency, and the power capacitors and the controller are configured to provide a voltage to the lamp with a peak resonance voltage immediately after toggling superimposed on a basic voltage, wherein an absolute value of an amplitude of the basic voltage declines with a saw-tooth waveform from an initial basic voltage level to approximately half the initial basic voltage level during the first half-cycle of the toggling period.

* * * * *